US012449612B2

(12) United States Patent
Chang et al.

(10) Patent No.: US 12,449,612 B2
(45) Date of Patent: Oct. 21, 2025

(54) FIBER OPTIC ADAPTER ASSEMBLY

(71) Applicant: Senko Advanced Components, Inc., Hudson, MA (US)

(72) Inventors: Jimmy Chang, Sturbridge, MA (US); Kazuyoshi Takano, Tokyo (JP); Paul Newbury, Ashland, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 18/157,107

(22) Filed: Jan. 20, 2023

(65) Prior Publication Data

US 2023/0152535 A1 May 18, 2023

Related U.S. Application Data

(63) Continuation of application No. 16/835,277, filed on Mar. 30, 2020, now Pat. No. 11,579,379.

(60) Provisional application No. 62/825,778, filed on Mar. 28, 2019.

(51) Int. Cl.
*G02B 6/38* (2006.01)
*G02B 6/40* (2006.01)
*G02B 6/42* (2006.01)

(52) U.S. Cl.
CPC ........... *G02B 6/406* (2013.01); *G02B 6/3821* (2013.01); *G02B 6/3825* (2013.01); *G02B 6/3879* (2013.01); *G02B 6/3893* (2013.01); *G02B 6/3897* (2013.01); *G02B 6/4284* (2013.01); *G02B 6/4292* (2013.01)

(58) Field of Classification Search
CPC .. G02B 6/3825; G02B 6/3893; G02B 6/3821; G02B 6/3879
See application file for complete search history.

(56) References Cited

U.S. PATENT DOCUMENTS

| 3,733,576 A | 5/1973 | Cooper |
| 4,645,295 A | 2/1987 | Pronovost |
| 5,181,267 A | 1/1993 | Gerace et al. |
| 5,222,168 A | 6/1993 | Saito et al. |

(Continued)

FOREIGN PATENT DOCUMENTS

| CN | 201740886 U | 2/2011 |
| JP | 2573482 | 3/1998 |

(Continued)

OTHER PUBLICATIONS

EX1027—Meriam Webster's Collegiate Dictionary, 11th ed., Cover and Bibliographic pages, p. 551 "groove," 2003, 4pgs.

(Continued)

*Primary Examiner* — Uyen Chau N Le
*Assistant Examiner* — Hoang Q Tran

(57) ABSTRACT

A fiber optic adapter assembly reduced in size from a SFP footprint to a SC footprint to accommodate a first fiber optic connector on a first side within one or more ports, and a second fiber optic connector on a second side within one or more ports. The first fiber optic connector is a duplex fiber optic connector with an overall length of about 50 mm and the second fiber optic connector is a behind-the-wall connector with an overall length of about 15 mm thereby reducing the overall length of a connector and adapter assembly for increasing optical fiber density.

19 Claims, 13 Drawing Sheets

(56) References Cited

U.S. PATENT DOCUMENTS

| | | | |
|---|---|---|---|
| 5,390,272 A | 2/1995 | Repta et al. | |
| 5,528,712 A | 6/1996 | Belenkiy et al. | |
| 5,615,293 A | 3/1997 | Sayegh | |
| 5,673,346 A | 9/1997 | Iwano et al. | |
| 5,719,977 A | 2/1998 | Lampert et al. | |
| 5,915,058 A | 6/1999 | Clairardin et al. | |
| 6,146,023 A | 11/2000 | Weigel | |
| 6,149,313 A | 11/2000 | Giebel et al. | |
| 6,220,762 B1 | 4/2001 | Kanai et al. | |
| 6,224,268 B1 | 5/2001 | Manning et al. | |
| 6,305,961 B1 | 10/2001 | Szilagyi et al. | |
| 6,331,079 B1 | 12/2001 | Grois et al. | |
| 6,357,931 B1 | 3/2002 | Shirakawa et al. | |
| 6,371,659 B1 | 4/2002 | Weigel | |
| 6,386,768 B1 | 5/2002 | Yoon et al. | |
| 6,419,399 B1 | 7/2002 | Loder et al. | |
| 6,450,695 B1 | 9/2002 | Matsumoto | |
| 6,511,230 B1 | 1/2003 | Connelly et al. | |
| 6,568,861 B2 | 5/2003 | Benner et al. | |
| 6,575,640 B2 | 6/2003 | Connelly et al. | |
| 6,715,928 B1 | 4/2004 | Matasek et al. | |
| 6,764,222 B1 | 7/2004 | Szilagyi et al. | |
| 6,796,715 B2 | 9/2004 | Chiu et al. | |
| 6,918,704 B2 | 7/2005 | Marrs et al. | |
| 6,929,406 B2 | 8/2005 | Amorim | |
| 7,001,081 B2 | 2/2006 | Cox et al. | |
| 7,150,567 B1 | 12/2006 | Luther et al. | |
| 7,204,644 B2 | 4/2007 | Barnes et al. | |
| 7,284,912 B2 | 10/2007 | Suzuki et al. | |
| 7,347,634 B2 | 3/2008 | Günther et al. | |
| 7,500,790 B2 | 3/2009 | Erdman et al. | |
| 7,628,545 B2 | 12/2009 | Cody et al. | |
| 7,677,812 B2 | 3/2010 | Castagna et al. | |
| 8,061,906 B2 | 11/2011 | Nehler et al. | |
| 8,406,597 B2 | 3/2013 | Case | |
| 8,465,317 B2 | 6/2013 | Gniadek et al. | |
| 8,556,646 B2 | 10/2013 | Kappla et al. | |
| 8,636,424 B2 | 1/2014 | Kuffel et al. | |
| 8,641,293 B2 | 2/2014 | Lin et al. | |
| 8,662,760 B2 | 3/2014 | Cline et al. | |
| 8,764,308 B2 | 7/2014 | Irwin et al. | |
| 8,834,038 B2 | 9/2014 | Limbert et al. | |
| 8,858,089 B2 | 10/2014 | Bradley | |
| 9,366,829 B2 | 6/2016 | Czosnowski et al. | |
| 9,411,111 B2 | 8/2016 | Banal, Jr. et al. | |
| 9,557,495 B2 | 1/2017 | Raven et al. | |
| 9,568,689 B2 | 2/2017 | Nguyen et al. | |
| 9,599,778 B2 | 3/2017 | Wong et al. | |
| 9,625,658 B1 | 4/2017 | Lin | |
| 9,684,130 B2 | 6/2017 | Veatch et al. | |
| 9,726,830 B1 * | 8/2017 | Gniadek | G02B 6/3885 |
| 9,829,653 B1 * | 11/2017 | Nishiguchi | G02B 6/3825 |
| 10,156,683 B2 | 12/2018 | Manes et al. | |
| 10,156,684 B2 | 12/2018 | Nguyen et al. | |
| 10,191,230 B2 | 1/2019 | Wong et al. | |
| 10,495,823 B2 | 12/2019 | Good et al. | |
| 10,890,723 B2 | 1/2021 | Nguyen et al. | |
| 11,061,190 B2 | 7/2021 | Takano et al. | |
| 11,181,701 B2 | 11/2021 | Wong et al. | |
| 11,307,369 B2 | 4/2022 | Takano et al. | |
| 11,333,836 B2 | 5/2022 | Wong et al. | |
| 11,340,405 B2 | 5/2022 | Hendrick | |
| 11,385,415 B2 | 7/2022 | Nguyen et al. | |
| 11,415,760 B2 | 8/2022 | Takano et al. | |
| 11,428,875 B2 | 8/2022 | Nguyen et al. | |
| 11,525,965 B2 | 12/2022 | Childers et al. | |
| 11,719,893 B2 | 8/2023 | Higley et al. | |
| 11,733,466 B2 | 8/2023 | Higley et al. | |
| 11,808,994 B1 | 11/2023 | Higley et al. | |
| 11,846,813 B2 | 12/2023 | Childers et al. | |
| 11,880,075 B1 | 1/2024 | Nguyen et al. | |
| 11,906,794 B2 | 2/2024 | Higley et al. | |
| 2003/0118293 A1 | 6/2003 | Canace et al. | |
| 2003/0147230 A1 | 8/2003 | Hutermans et al. | |
| 2004/0043654 A1 | 3/2004 | Lee et al. | |
| 2004/0078961 A1 | 4/2004 | Chen et al. | |
| 2004/0247252 A1 | 12/2004 | Ehrenreich et al. | |
| 2005/0111796 A1 | 5/2005 | Matasek et al. | |
| 2005/0135752 A1 | 6/2005 | Kiani et al. | |
| 2005/0135753 A1 | 6/2005 | Eigenmann et al. | |
| 2005/0136722 A1 | 6/2005 | Cairns | |
| 2005/0281509 A1 | 12/2005 | Cox et al. | |
| 2008/0037938 A1 | 2/2008 | Kiani et al. | |
| 2008/0144303 A1 | 6/2008 | Ice | |
| 2008/0260333 A1 | 10/2008 | Roth | |
| 2010/0284656 A1 | 11/2010 | Morra et al. | |
| 2011/0019962 A1 | 1/2011 | Childers et al. | |
| 2011/0091159 A1 | 4/2011 | de Jong et al. | |
| 2011/0299814 A1 | 12/2011 | Nakagawa | |
| 2012/0057824 A1 | 3/2012 | Katoh | |
| 2012/0057826 A1 | 3/2012 | Katoh | |
| 2012/0082416 A1 | 4/2012 | Katoh | |
| 2012/0099822 A1 | 4/2012 | Kuffel | |
| 2012/0141072 A1 | 6/2012 | Katagiyama et al. | |
| 2012/0177326 A1 | 7/2012 | Peng et al. | |
| 2012/0213484 A1 | 8/2012 | Childers et al. | |
| 2013/0094816 A1 | 4/2013 | Lin et al. | |
| 2013/0122745 A1 | 5/2013 | Soubh et al. | |
| 2013/0308916 A1 | 11/2013 | Buff | |
| 2013/0322825 A1 | 12/2013 | Cooke et al. | |
| 2013/0322826 A1 | 12/2013 | Henke et al. | |
| 2014/0241689 A1 | 8/2014 | Bradley et al. | |
| 2016/0054528 A1 * | 2/2016 | Smrha | G02B 6/3825 385/88 |
| 2016/0116685 A1 * | 4/2016 | Wong | H01R 13/6335 385/56 |
| 2016/0161680 A1 | 6/2016 | Nguyen et al. | |
| 2016/0178850 A1 | 6/2016 | Nhep | |
| 2016/0202431 A1 | 7/2016 | Hill et al. | |
| 2016/0238796 A1 | 8/2016 | Nguyen et al. | |
| 2016/0327756 A1 | 11/2016 | Raven et al. | |
| 2017/0153879 A1 | 6/2017 | George et al. | |
| 2017/0205587 A1 | 7/2017 | Chang et al. | |
| 2017/0205588 A1 * | 7/2017 | Lee | G02B 6/3825 |
| 2017/0227720 A1 | 8/2017 | Lin | |
| 2017/0343740 A1 | 11/2017 | Nguyen | |
| 2017/0351037 A1 | 12/2017 | Watanabe et al. | |
| 2017/0363818 A1 | 12/2017 | Suzic | |
| 2018/0106972 A1 | 4/2018 | Liu et al. | |
| 2018/0217340 A1 | 8/2018 | Wong et al. | |
| 2018/0224608 A1 | 8/2018 | Liu et al. | |
| 2018/0252872 A1 | 9/2018 | Chen | |
| 2018/0259717 A1 * | 9/2018 | Takano | G02B 6/389 |
| 2018/0292618 A1 * | 10/2018 | Chang | G02B 6/3874 |
| 2019/0018201 A1 | 1/2019 | Takano et al. | |
| 2019/0018209 A1 | 1/2019 | Takano et al. | |
| 2019/0064447 A1 * | 2/2019 | Chang | G02B 6/4292 |
| 2019/0204513 A1 | 7/2019 | Davidson et al. | |
| 2019/0243072 A1 | 8/2019 | Takano et al. | |
| 2020/0285005 A1 | 9/2020 | Watanabe et al. | |
| 2021/0099229 A1 | 4/2021 | Cox et al. | |
| 2023/0213709 A1 | 7/2023 | Higley et al. | |
| 2023/0393351 A1 | 12/2023 | Childers et al. | |

FOREIGN PATENT DOCUMENTS

| | | |
|---|---|---|
| JP | 2001305391 A | 10/2001 |
| JP | 2004-354693 A | 12/2004 |
| JP | 3886610 B2 | 2/2007 |
| JP | 2012-53375 A | 3/2012 |
| WO | WO2012/174227 A2 | 12/2012 |
| WO | WO2013/100892 A1 | 7/2013 |
| WO | WO2014/057264 A2 | 4/2014 |
| WO | WO2015/027033 A1 | 2/2015 |
| WO | WO2017/127208 A1 | 7/2017 |
| WO | WO2018/042775 A1 | 3/2018 |

(56) References Cited

FOREIGN PATENT DOCUMENTS

| | | |
|---|---|---|
| WO | WO2019126337 A1 | 6/2019 |
| WO | WO2002/042818 A1 | 5/2022 |

OTHER PUBLICATIONS

EX1028—The Deposition of Witness, William Singhose, Ph.D, The United States International Trade Commission, Investigation No. 337-TA, Sep. 9, 2024', 82pgs.
EX1028—QSFP-DD, "Thermal Whitepaper: Enabling QSFP-001600 Ecosystem With Performance-Driven Thermal Innovations," accessed on the internet at www.qsfp-dd.com/wp-content/uploads/, retrieved Aug. 6, 2024, 12pgs.
EX1029—Representative Domestic Industry Claim Chart for U.S. Pat. No. 11,385,415 by MMC Adapters, Aug. 19, 2024, 5pgs.
EX2002—Molex Adaptor, Jul. 24, 2024, 1pg.
EX2003—Encyclopedia.com, Definition of Frame, accessed on the internet at https://www.encyclopedia.com/science-and-technology/computers-and-electrical-engineering/computers-and-computing/frame, retrieved Jul. 23, 2024, 12pgs.
Exhibit 1002—Declaration of Edward Lurie, *Senko Advanced Components, Inc.*, Petitioner v. *US Conec Ltd.*, Patent Owner, Before the Patent Trial and Appeal Board, Case PGR2024-00046, U.S. Pat. No. 11,808,994, dated Jul. 10, 2024, 362pgs.
Exhibit 1016—MOLEX—SFP-DD Hardware Specification for SFP Double Density 2x Pluggable Transceiver, Rev 1.0, Sep. 14, 2017, 50pgs.
Exhibit 1028—Tutorials of Fiber Optic Products, "Fiber Optic Connector Polishing," accessed on the internet at https://www.fiber-optic-tutorial.com/category/network-solutions/fiber-optic-polishing, retrieved Jun. 4, 2024, 6pgs.
Exhibit 1029—Fiber Cabling Solution, "UPC or APC—Which One to Choose?," accessed on the internet at https://www.fiber-optic-cable-sale.com/upc-or-apc-which-one-to-choose.html, retrieved Jun. 4, 2024, 3pgs.
Exhibit 1030—Belden, "APC vs. UPC: What's the Difference?," accessed on the internet at https://www.belden.com/blogs/upc-or-apc#:~:text=The main difference between APC,curvature for better core alignment 1, retrieved Jun. 4, 2024, 3pgs.
Exhibit 1035—QSFP-DD, "QSFP-DD MSA Group Announces New Hardware Specification," accessed on the internet at www.qsfp-dd.com/qsfp-dd-msa-group-announces-new-hardware-specification/, retrieved Jul. 10, 2024, 2pgs.
Exhibit 1036—QSFP-DD, "QSFP-DD MSA Group Announces New Hardware Specification," Internet Archive WayBack Machine, accessed on the internet at www.qsfp-dd.com/qsfp-dd-msa-group-announces-new-hardware-specification/, retrieved Oct. 29, 2017, 2pgs.
Exhibit 1037—SFP-DD, SFP-DD MSA Releases Specification for High-Speed, High-Density Interface, accessed on the internet at sfp-dd.com/2017/09/sfp-dd-msa-releases-specification-for-high-speed-high-density-interface/, retrieved Jul. 10, 2024, 4pgs.
Exhibit 1038—SFP-DD, SFP-DD MSA Releases Specification for High-Speed, High-Density Interface, Internet Archive WayBack Machine, accessed on the internet at sfp-dd.com/2017/09/sfp-dd-msa-releases-specification-for-high-speed-high-density-interface/, retrieved Oct. 15, 2017, 3pgs.
Patent Owner's Preliminary Response Under 37 C.F.R. § 42.107(a), *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Jul. 24, 2024, 44pgs.
Petition for Post-Grant Review of U.S. Pat. No. 11,808,994, *Senko Advanced Components, Inc.*, Petitioner v. *US Conec Ltd.*, Patent Owner, Before the Patent Trial and Appeal Board, Case PGR2024-00046, U.S. Pat. No. 11,808,994, dated Jul. 23, 2024, 266pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00117, U.S. Pat. No. 11,333,836 B2, dated Jul. 9, 2024, 25pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00118, U.S. Pat. No. 11,340,413 B2, dated Jul. 9, 2024, 28pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00120, U.S. Pat. No. 10,191,230 C1, dated Jul. 9, 2024, 44pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00121, U.S. Pat. No. 11,181,701 B2, dated Jul. 9, 2024, 26pgs.
Paper 7, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00115, U.S. Pat. No. 11,307,369 B2, dated Jul. 9, 2024, 20pgs.
Paper 7, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00116, U.S. Pat. No. 11,307,369 B2, dated Jul. 9, 2024, 16pgs.
Petitioner's Reply to Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Aug. 19, 2024, 10pgs.
Petitioner's Request for Rehearing of the Institution Decision, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jul. 5, 2024, 19pgs.
Paper 9, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00119, U.S. Pat. No. 11,415,760 B2, dated Jul. 9, 2024, 41pgs.
Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 131pgs.
Fibermart, "Fiber Optic Connector Tutorial," accessed on the internet at https://www.fiber-mart.com/news/fiber-optic-connector-tutorial-a-848.html, retrieved Dec. 21, 2023, 5pgs.
"Fiber Optic Rack Mount Enclosure, 3-Panel 1 RMS," accessed on the internet at https://www.computercablestore.com/fiber-optic-rack-mount-enclosure-3-panel-1-rms, retrieved Dec. 21, 2023, 4pgs.
Liteon, "19-Inch Rack," accessed on the internet at https://liteon-cips.com/products/racks/19-inch-rack/, retrieved Dec. 21, 2023, 5pgs.
Wagner et al., "SC-DC/SC-QC fiber optic connector," Opt. Eng., 37(12) 3129-3133, Dec. 1998.
Wenke, "Report on Fiber Optic Cables," Optical Communication ONT, Hochschule Bremen, City University of Applied Sciences, pp. 1-30, Dec. 18, 2015.
Kant, "Data center evolution A tutorial on state of the art, issues, and challenges," Computer Networks, 53:2939-2965, 2009.
Curran et al. "Basics of Fiber Optics," Amphenol Fiber Systems International, pp. 1-13, dated no later than Jan. 11, 2024.
Nishimura et al., "High-Density Multi-Fiber Connectors for Optical Interconnection," Furukawa Review, 34:13-16, Aug. 29, 2008.
Gurreri et al., "Multi-Fiber, MT Ferrule Endface Fiber Tip Displacement Model for Physical Contact Interconnects," 2006, pp. 1-12.
Declaration of James F. Brennan III, Ph.D. in Support of Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 294pgs.

(56) References Cited

OTHER PUBLICATIONS

Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 22, 2023, 177pgs.
"HDI-45 connector," accessed on the internet at https://en.wikipedia.org/wiki/HDI-45_connector, retrieved Dec. 22, 2023, 4pgs.
Google Data Centers gallery, accessed on the internet at https://www.google.com/about/datacenters/gallery/, retrieved Dec. 24, 2023, 83pgs.
Order Staying Case, *Senko Advanced Components, Inc.* vs. *US Conec Ltd.*, In the United States District Court for the District of Delaware, C.A. No. 23-083 (JPM), Jul. 6, 2023, 2pgs.
Kordz, "RJ45 CAT6 Field Termination Connector & & Strain Relief," Technical Data Sheet, kordz.com, 2019, 2pgs.
"Machine Design—An Integrated Approach," $3^{rd}$ Edition, Pearson College Div, Jan. 1, 2005, 93pgs.
Declaration of William Singhose, PH.D. in Support of Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 19, 2023, 342pgs.
Petition for Inter Partes Review of U.S. Pat. No. 11,385,415, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Apr. 12, 2024, 207pgs.
Scheduling Order, *Senko Advanced Components, Inc.* vs. *US Conec Ltd.*, In the United States District Court for the District of Delaware, Case No. 1:23-cv-00083-JPM, Mar. 12, 2024, 9pgs.
Declaration of Edward Lurie, *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Apr. 11, 2024, 386pgs.
U.S. Appl. No. 61/789,499, filed Mar. 15, 2013, 32pgs.
Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 28, 2023, 112pgs.
"Maelstrom (ride)," Wikipedia, accessed on the internet at https://en.wikipedia.org/wiki/Maelstrom_(ride), retrieved Dec. 27, 2023, 3pgs.
Declaration of William Singhose, PH.D. in Support of Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 27, 2023, 330pgs.
"Fiber Optic adapter/Coupler Tutorial," accessed on the internet at https://community.fs.com/article/fiber-optic-adaptercoupler-tutorial.html, retrieved Dec. 21, 2023, 4pgs.
"What Is Optical Fiber Technology, and How Does It Work?," accessed on the internet at https://www.nai-group.com/optical-fiber-technology-how-it-works/, retrieved Dec. 21, 2023, 8pgs.
Petition for Inter Partes Review of U.S. Pat. No. 11,333,836, *US Conec Ltd.*, Petitioner v. *Senko Advanced Components, Inc.*, Before the Patent Trial and Appeal Board, Case IPR2024-00117, U.S. Pat. No. 11,333,836, dated Dec. 30, 2023, 131pgs.
U.S. Appl. No. 62/546,920, filed Aug. 17, 2017, 76pgs.
U.S. Appl. No. 62/458,042, filed Feb. 13, 2017, 22pgs.
U.S. Appl. No. 62/463,898, filed Feb. 27, 2017, 87pgs.
U.S. Appl. No. 62/457,150, filed Feb. 9, 2017, 76pgs.
U.S. Appl. No. 62/463,901, filed Feb. 27, 2017, 87pgs.
Moxel Adaptor, dated no later than Apr. 22, 2024, 1pg.
Hendrick, "Interface Specification for MDC Receptacle," Feb. 6, 2020, 7pgs.
Declaration of William Singhose, PH.D. in Support of Petition for Inter Partes Review, *US Conec Ltd.*, Petitioner v. *Senko Advanced Components, Inc.*, Patent Owner, Before the Patent Trial and Appeal Board, Case IPR2024-00117, U.S. Pat. No. 11,333,836, 225pgs.
Fiberoad, "QSFP-DD releases Interface Specification," accessed on the internet at https://fiberroad.com/400g-qsfpdd-dco-standards/, retrieved Dec. 30, 2023, 3pgs.
Cabling, "QSFP-DD MSA Group intros new specs, plus white paper," accessed on the internet at https://www.cablinginstall.com/standards/article/14203903/qsfp-dd-msa-group-intros-new-specs-plus-white-paper, retrieved Dec. 30, 2023, 3pgs.
Lightwave, "QSFP-DD MSA Group offers rev 6.0 specifications for QSFPDDS00, QSFP112," accessed on the internet at https://www.lightwaveonline.com/optical-tech/transmission/article/14204021/qsfp-dd-msa-group-offers-rev-60-specifications-for-qsfp-dd800-qsfp112, retrieved Dec. 30, 2023, 4pgs.
Jenkins et al., "Controlling Human Perception of Haptic Profiles Using Contextual Cues," 2023 IEEE World Haptics Conference (WHC), WHC 2023, Delft, Netherlands, Jul. 10-13, 2023, pp. 1-7.
Petition for Inter Partes Review of U.S. Pat. No. 11,415,760, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 126pgs.
Patent Owner's Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Apr. 18, 2024, 42pgs.
Assignment of U.S. Appl. No. 14/996,865, Takano, Gniadek to Senko Advanced Components, Inc., dated Jan. 15, 2016, 3pgs.
Assignment of U.S. Appl. No. 14/521,414, Wong, Ruffner to Senko Advanced Components, Inc., dated Apr. 23, 2015, 8pgs.
Declaration of Eric Pearson, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Apr. 17, 2024, 35pgs.
The New-Oxford American Dictionary, $2^{nd}$ ed., Cover and Bibliographic pages, p. 1596 "Slickenslide—Slip," 2005, 4pgs.
Meriam Webster's Collegiate Dictionary, $11^{th}$ ed., Cover and Bibliographic pages, p. 1172 "sleep—slider," 2012, 4pgs.
Webster's New International Dictionary of the English Language, $2^{nd}$ ed., p. 2364, "Slick-Slight," 1947, 4pgs.
Satake, "The History of the MT and its Variations," accessed on the internet at IEEE Xplore, retrieved Oct. 30, 2023, 2pgs.
Nissin Kasei USA Corp., "MPO Connector Kit, Product Specifications," dated no later than Apr. 22, 2024, 9pgs.
Furukawa Electric, "MT Ferrules," accessed on the internet at https://www.furukawa.eo.jp/telecom/en/product/connector/product/mt.html#:- :text=MT ferrules are key components, wealth of technology and experience., retrieved Nov. 1, 2023, 4pgs.
OCC, "18 Port Rack Mount Fiber Enclosure," accessed on the internet at https://www.computercablestore.com/18-port-rack-mount-fiber-enclosure, retrieved Dec. 18, 2023, 4pgs.
"Rack unit," accessed on the internet https://en.wikipedia.org/wiki/Rack_unit, retrieved Oct. 24, 2023, 5pgs.
Declaration of James F. Brennan III, Ph.D. in Support of Petition for Inter Partes Review, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 281pgs.
Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jan. 4, 2024, 147pgs.
Patent Owner's Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 27, 2024, 93pgs.
International Standard, "Fibre optic interconnecting devices and passive components—Fibre optic connector interfaces—Part 20: Type LC connector family," Ed. 2.0, Apr. 2012, 30pgs.
Senko, "The Importance of Proper Crimping in Fiber Optic Assemblies," Application Note, Rev. 01, pp. 1-9, Feb. 2021.
Buijs, Marcel, Fiber Optic Center, "Proper Crimping Techniques are Critical When Terminating Fiber Optic Connectors," FOC Blogs,

(56) References Cited

OTHER PUBLICATIONS accessed on the internet https://focenter.com/blog/proper-crimping-techniques-are-critical-when-terminating-fiber-optic-connectors, retrieved Feb. 20, 2024, 7pgs.
Bulgin, "Terminating and crimping for fiber optics:methods and tips," Nov. 25, 2019, accessed on the internet https://community.element14.com/products/manufacturers/bulgin/b/blog/posts/terminating-and-crimping-for-fiber-optics-methods-and-tips, retrieved Feb. 20, 2024, 4pgs.
Cambridge English Dictionary, "Meaning of elongate in English," accessed on the internet https://dictionary.cambridge.org/us/dictionary/english/elongate, retrieved Feb. 20, 2024, 8pgs.
Declaration of Eric Pearson, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 26, 2024, 115pgs.
Leviton, "Application Note: Understanding Duplex Polarity," 2020, 3pgs.
L-com Fiber Coupler, LC Duplex Bronze Sleeve, Low Profile (SKU_ FOA-802), dated no later than Apr. 22, 2024, 1pg.
Huber+Suhner LC-XD Connector, dated no later than Apr. 22, 2024, 2pgs.
PolyPhaser Fiber Optic Patch Cord Duplex Uniboot LC to LC Single Mode Fiber, OFNR, Yellow 3.0mm Jacket, 5m (SKU_ FPC2LCLC-USMRY30-05), dated no later than Apr. 22, 2024, 2pgs.
Universal LC Fiber Cable—Singlemode 9_125—Plenum 4M with Uniboot LC Connectors (SKU_FODULC-SNG-4m), dated no later than Apr. 22, 2024, 10pgs.
Declaration of James F. Brennan III, Ph.D. in Support of Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, U.S. Pat. No. 11,061,190, IPR2024-00122, dated Jan. 4, 2024, 271pgs.
Petition [1 of 2] for Inter Partes Review of U.S. Pat. No. 11,307,369 [Claims 1-22], *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 6, 2024, 121pgs.
Petition [2 of 2] for Inter Partes Review of U.S. Pat. No. 11,307,369 [Claims 23-40], *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 6, 2024, 126pgs.
Declaration of James F. Brennan III, Ph.D. in Support of Petition for Inter Partes Review of Claims 23-40 of U.S. Pat. No. 11,307,369, *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 5, 2024, 257pgs.
Declaration of James F. Brennan III, Ph.D. in Support of Petition for Inter Partes Review of Claims 1-22 of U.S. Pat. No. 11,307,369, *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 5, 2024, 256pgs.
Decision Denying Institution of Inter Partes Review, *US Conec Ltd. V. Senko Advanced Components Inc*, Before the Patent Trial and Appeal Board, Case IPR2024-00122, U.S. Pat. No. 11,061,190, Jun. 5, 2024, 23 pages.
White Paper: SC-RJ—Reliability for Every Category, 2008, 14 pages.
Petition for Post-Grant Review of U.S. Pat. No. 11,733,466, *Senko Advanced Components* v. *US Conec LTD*, Case PGR2024-00032, May 21, 2024, 242 pages.
Declaration of Edward Lurie, *Senko Advanced Components* v. *US Conec LTD*, Case PGR2024-00032, U.S. Pat. No. 11,733,466, May 19, 2024, 310 pages.
U.S. Appl. No. 62/532,710, filed Jul. 14, 2017, 79 pages.
QSFP-DD Hardware Specification, Sep. 19, 2017, 69 pages.
TIA/EI Standard, FOCIS 10 Fiber Optic Connector Intermateability Standard—Type LC, 2002, 38 pages.
CS Connector, May 20, 2024, 8 pages.
Exhibit I, US Conec EX1007, IPR2024-00116, U.S. Pat. No. 11,307,369, dated no later than Apr. 22, 2024; 4pgs.
BSI Standards Publication, Fibre Optic Interconnecting Devices and Components, Part 24, Jan. 2010, 32pgs.
INTL Standard 61754-4 ed1.2b Connector interfaces SC connector, Mar. 2002, 92pgs.
Declaration of Edward M. Cady, Jr., *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 19, 2024, 258pgs.
Petition for Inter Partes Review of U.S. Pat. No. 11,880,075, *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 20, 2024, 159pgs.
Representative Claim Chart Showing Infringement of U.S. Pat. No. 11,880,075, Mar. 22, 2024, 67pgs.
Declaration of Edward Lurie, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 14, 2024, 311pgs.
Petition for Post-Grant Review of U.S. Pat. No. 11,906,794, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 20, 2024, 270pgs.
U.S. Appl. No. 62/649,539, filed Mar. 28, 2018, 209pgs.
U.S. Appl. No. 62/640,914, filed Mar. 9, 2018, 41pgs.
Senko Advanced Components, "The Importance of Proper Cleaving for Fiber Optic Connectors," Application Engineering Note, Feb. 2022, 10pgs.
Thorlabs, Guide to Connectorization and Polishing Optical Fibers, FN96A, Apr. 17, 2013, 36pgs.
Designerdata Polypropylene, accessed on the internet at https://designerdata.nl/materials/plastics/thermo-plastics/polypropylene-(cop.)?cookie=YES, retrieved Apr. 28, 2024, 2pgs.
Typical Engineering Properties of Polypropylene, INEOS Olefins & Polymers USA, accessed on the internet at www.ineos-op.com, Apr. 2014, 2pgs.
The Engineering ToolBox: Polymers, accessed on the internet at https://www.engineeringtoolbox.com/polymer-properties-d_1222.html, retrieved Apr. 28, 2024, 9pgs.
Omnexus Plastics & Elastomers, accessed on the internet at https://omnexus.specialchem.com/polymer-property/young-modulus, retrieved Apr. 28, 2024, 14pgs.
U.S. Appl. No. 62/793,198, filed Jan. 16, 2019, 55pgs.
U.S. Appl. No. 62/653,706, filed Apr. 6, 2018, 19pgs.
Exhibit A-1—U.S. Pat. No. 11,733,466 Invalidity Claim Chart, Jun. 21, 2024, 55pgs.
Exhibit A-2—U.S. Pat. No. 11,733,466 Invalidity Claim Chart, Jun. 21, 2024, 43pgs.
Exhibit A-3—U.S. Pat. No. 11,733,466 Invalidity Claim Chart, Jun. 21, 2024, 49pgs.
Exhibit A-4—U.S. Pat. No. 11,733,466 Invalidity Claim Chart, Jun. 21, 2024, 37pgs.
Exhibit B-1—U.S. Pat. No. 11,808,994 Invalidity Claim Chart, Jun. 21, 2024, 38pgs.
Exhibit B-2—U.S. Pat. No. 11,808,994 Invalidity Claim Chart, Jun. 21, 2024, 64pgs.
Exhibit B-3—U.S. Pat. No. 11,808,994 Invalidity Claim Chart, Jun. 21, 2024, 68pgs.
Exhibit B-4—U.S. Pat. No. 11,808,994 Invalidity Claim Chart, Jun. 21, 2024, 53pgs.
Exhibit C-1—U.S. Pat. No. 11,906,794 Invalidity Claim Chart, Jun. 21, 2024, 105pgs.
Exhibit C-2—U.S. Pat. No. 11,906,794 Invalidity Claim Chart, Jun. 21, 2024, 98pgs.
Exhibit C-3—U.S. Pat. No. 11,906,794 Invalidity Claim Chart, Jun. 21, 2024, 105pgs.
Exhibit C-4—U.S. Pat. No. 11,906,794 Invalidity Claim Chart, Jun. 21, 2024, 33pgs.

(56) References Cited

OTHER PUBLICATIONS

Exhibit C-5—U.S. Pat. No. 11,906,794 Invalidity Claim Chart, Jun. 21, 2024, 39pgs.
Exhibit C-6—U.S. Pat. No. 11,906,794 Invalidity Claim Chart, Jun. 21, 2024, 22pgs.
Exhibit D-1—U.S. Pat. No. 11,880,075 Invalidity Claim Chart, Jun. 21, 2024, 90pgs.
Exhibit D-2—U.S. Pat. No. 11,880,075 Invalidity Claim Chart, Jun. 21, 2024, 91pgs.
Exhibit D-3—U.S. Pat. No. 11,880,075 Invalidity Claim Chart, Jun. 21, 2024, 86pgs.
Exhibit E-1—U.S. Pat. No. 11,385,415 Invalidity Claim Chart, Jun. 21, 2024, 50pgs.
Exhibit E-2—U.S. Pat. No. 11,385,415 Invalidity Claim Chart, Jun. 21, 2024, 25pgs.
Exhibit E-3—U.S. Pat. No. 11,385,415 Invalidity Claim Chart, Jun. 21, 2024, 57pgs.
Exhibit E-4—U.S. Pat. No. 11,385,415 Invalidity Claim Chart, Jun. 21, 2024, 57pgs.
Exhibit E-5—U.S. Pat. No. 11,385,415 Invalidity Claim Chart, Jun. 21, 2024, 8pgs.
Exhibit F-1—U.S. Pat. No. 10,495,823 Invalidity Claim Chart, Jun. 21, 2024, 29pgs.
Exhibit F-2—U.S. Pat. No. 10,495,823 Invalidity Claim Chart, Jun. 21, 2024, 26pgs.
Exhibit G—Other Validity Grounds (Non-Prior Art), Jun. 21, 2024, 54pgs.
Molex Incorporated, HBMT Motherboard Adapter, Doc. No. SD-106105-100MX, Oct. 31, 2005, 2pgs.

* cited by examiner

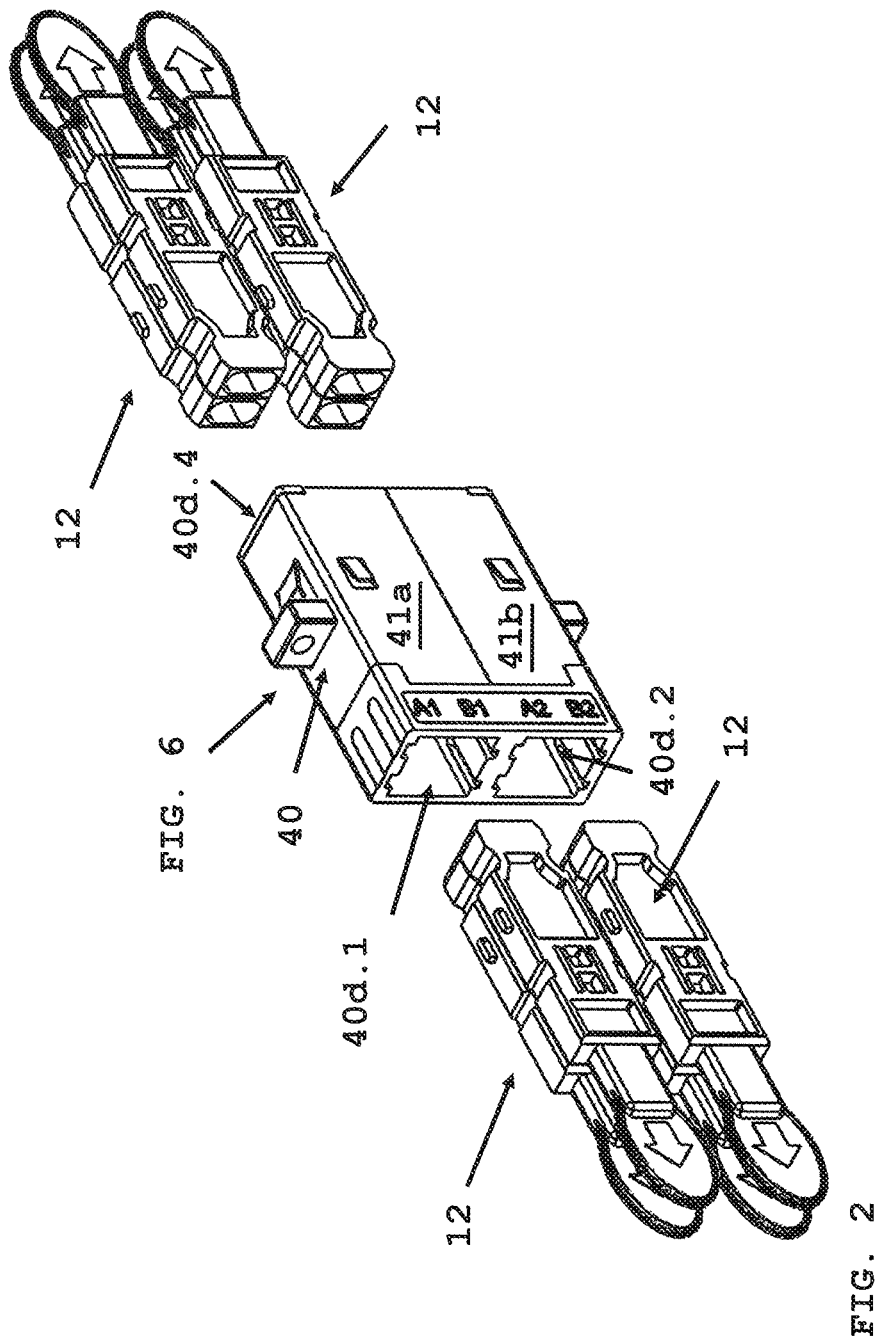

FIBER OPTIC ADAPTER ASSEMBLY

CROSS-REFERENCE TO RELATED APPLICATIONS

This application claims priority to U.S. Non Provisional Patent Application Ser. No. 16/835,277 filed on Mar. 30, 2020, which claims priority to U.S. Provisional Patent Application Ser. No. 62/825,778 filed on Mar. 28, 2019, all of which are hereby incorporated by reference in it is entirety.

BACKGROUND

The use of fiber optics for communications purposes continues to grow. Data, voice, and other communication networks are increasingly using fiber optics to carry information. Conventional fiber optic cables include optical fibers that conduct light in the transmission of voice, video, and data information. Optical cables have the advantages of large bandwidth and low power loss. Typical applications for optical cables include fiber-to-the-curb (FTTC). fiber-to-the-home (FTTH), fiber-to-the-desk (FTTD), fiber-to-the-antenna (FTTA), plenum, riser, local area networks (LANs). and closed circuit television systems (CCTV)

In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit over the connection without interruption.

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of ceramic or other suitable material. A multi-fiber optic cable is terminated in the connector, and a plurality of individual optical fibers of the cable may be terminated in the ferrule. A popular type of fiber optic cable is a multi-fiber flat, or ribbon cable.

Adapters are configured to accept opposing fiber optic connectors along a longitudinal path formed by opposing ports. A first port and a second port are configured to accept similar fiber optic connectors to form an optical signal pathway for a simplex adapter. A duplex adapter has two ports side-by-side on a first side and two opposing ports on a second side. Each port has internal structure such as hooks, alignment sleeves or cut-outs formed as part of the inner body structure of an outer housing of the adapter body to accept a first fiber optic connector and a second fiber optic connector where the first fiber optic connector opposing the second fiber optic connector may be of the same type of fiber optic connector or dissimilar fiber optic connectors. Each fiber optic connector has at least one ferrule or two ferrules side-by-side with at least one optical fiber therein. A simplex fiber optic connector has one ferrule. A duplex fiber optic connector has two ferrules. A fiber optic connector may have a mechanical transfer ferrule with a plural of optical fibers therein such as twelve (12) or twenty-four (24). Each ferrule is assembled with a ferrule flange and the ferrule itself, and the ferrule is received within an alignment sleeve holder opening. The ferrule assembly comprising the ferrule, ferrule flange, and alignment sleeve holder are all biased by a spring at a distal end of the ferrule assembly.

SUMMARY

In one aspect, a SFP footprint duplex adapter as depicted in FIG. 1, has an adapter outer housing width of about 26.2 mm between the two ports and an overall width of about 30.7 mm with a mounting clip. The mounting clip is placed about the adapter housing thereby allowing the adapter to be secured within a panel. A SFP footprint simplex adapter has an overall width of about 18.0 mm with the mounting clip and the adapter outer housing is about 13.1 mm. When the fiber optic connector is not installed in the port, a dust cap is inserted to help ensure debris do not collect within the adapter port. A pair of SC footprint duplex adapters may be stacked vertically, as shown in FIG. 2, with the mounting clips. Each port may be configured to accept two fiber optic connectors side-by-side, and with a second pair vertically stacked, the adapter is configured a quad adapter. In the present invention, rotating the alignment sleeve holder openings from a vertical to a horizontal position, adding a bridge member between the alignment sleeve holder openings allow the removal of outer housing material, as depicted in FIG. 4, to reduce the overall footprint of the SFP footprint duplex adapter housing from about 13.75 mm to 12 mm along the horizontal side and from 12.45 mm to about 9.50 mm along the vertical side, without the mounting clip. This space savings allows for a higher density configuration within existing panels currently deployed in data warehouses. This aspect of the invention then allows for greater density fiber optic connectors thereby improving data throughput in existing data centers where is not possible to reconfigure the existing data warehouse. This also improves data throughput for new data warehouses. A data warehouse is a plurality of servers that provides data in the form of an optical signal for delivery over the internet.

In another aspect, the adapter housing length along the optical axis is reduced when deploying a behind-the-wall optical connector as depicted in FIG. 8 and FIG. 10. In a data warehouse, adapters are secured within the panel, and the panel reaches from the floor to the ceiling. Each individual panel is moveable along a floor tracking system. The reduced dimensions of the adapter increased the number of movable panels deployed, as part of a larger racking system in a data warehouse.

In another aspect of the invention, a behind-the-wall fiber optic connector comprises an outer housing, ferrule assembly with a ferrule and flange, a bias spring forming the ferrule assembly and an inner body configured to secure to the outer housing. When assembled the inner body and outer housing retains the ferrule assembly the bias spring forming the behind-the-wall connector. In another aspect of this embodiment, the inner body is configured with opposing hooks that are configured to accept a second opposing fiber optic connector. In another aspect of this embodiment, the inner front body has open sidewall. This allows one end of the alignment sleeve holder openings to be partially open thereby reducing the duplex fiber optic connector size. Without the sidewalls, a shelf is provided to hold the ferrule and align it within the alignment sleeve holder opening thereby removing the alignment sleeve as a separate component.

Other aspects and features will be apparent hereinafter.

BRIEF DESCRIPTION OF THE FIGURES

FIG. 2 depicts a set of duplex adapters, similarly configured as depicted in FIG. 6, are stacked vertically forming a quad adapter each configured to accept a pair of duplex fiber optic connectors in each port;

DETAILED DESCRIPTION

Figure 1:
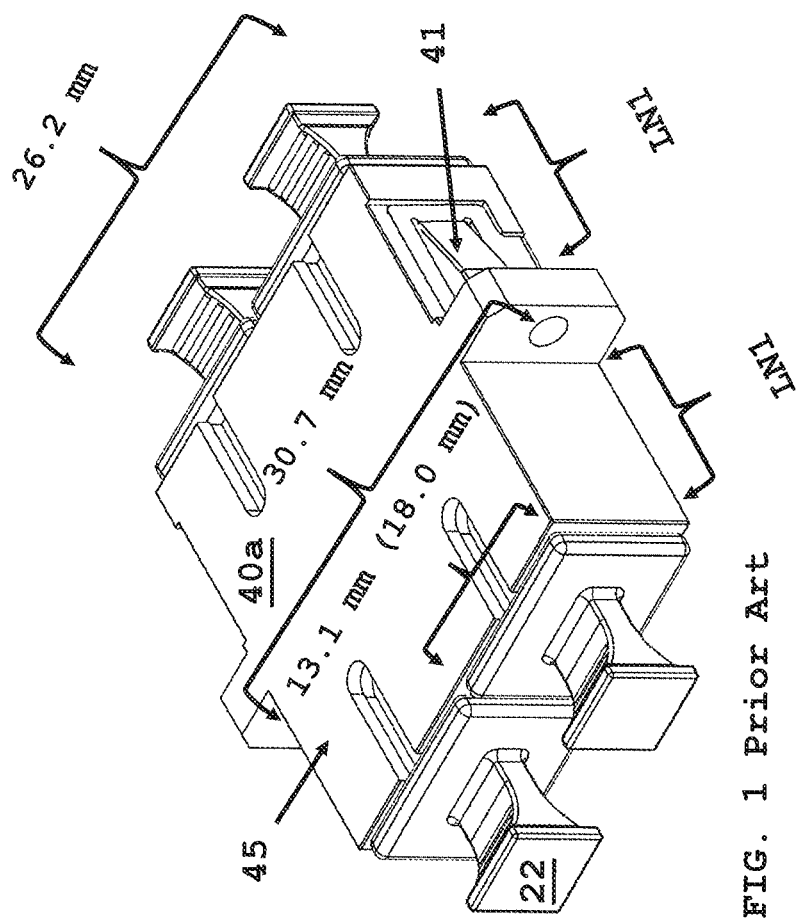
FIG. 1 depicts a prior art duplex adapter with removable dust caps configured to accept a simplex fiber optic connector in each port.

Thousands of fiber optic adapters (40a) as depicted in FIG. 1 are deployed in data centers or data warehouses. Adapters have at least one port on the first side and an opposing port on the second side, called a simplex adapter configured to accept two simplex connectors. The duplex adapter (40a) has a mounting clip (41) secured about the adapter housing (45). Mounting clip (41) secures adapter (40a) in a panel (not shown) for use as described in the Summary. The width of a prior art duplex adapter (40a) is about 26.2 mm with an overall width of 30.7 mm from mounting hole to mounting hole formed as part of mounting clip (41). The duplex adapter is made up of two simplex adapters. As depicted in FIG. 1, the simplex adapter width is about 18.0 mm with an overall width of about 13.1 mm between mounting holds (not shown). When an adapter port is without a fiber optic connector (10, 12) (refer to FIG. 11), the adapter port is secured against debris with dust cap (22). There is a long-felt need to reduce the outer dimensions of the fiber optic adapter (40a) to allow more adapters deployed within a data centers' existing layout of adapter panels. In FIG. 1, this adapter is configured to accept a simplex fiber optic connector, which is a fiber optic connector having one ferrule, as opposed to a duplex fiber optic connector as shown in FIG. 12, with two ferrules formed with a ferrule flange (16a, 16b). The simplex connector is a single ferrule with an optical fiber therein handling transmission (Tx) and receiving (Rx) under the supervision of supporting electronics and software as is known in the prior art. Adapter (40a) has an overall length of 2LN1, where LN1 is determined by the type of adapter footprint such as SFP or SC.

Figures 5, 6:
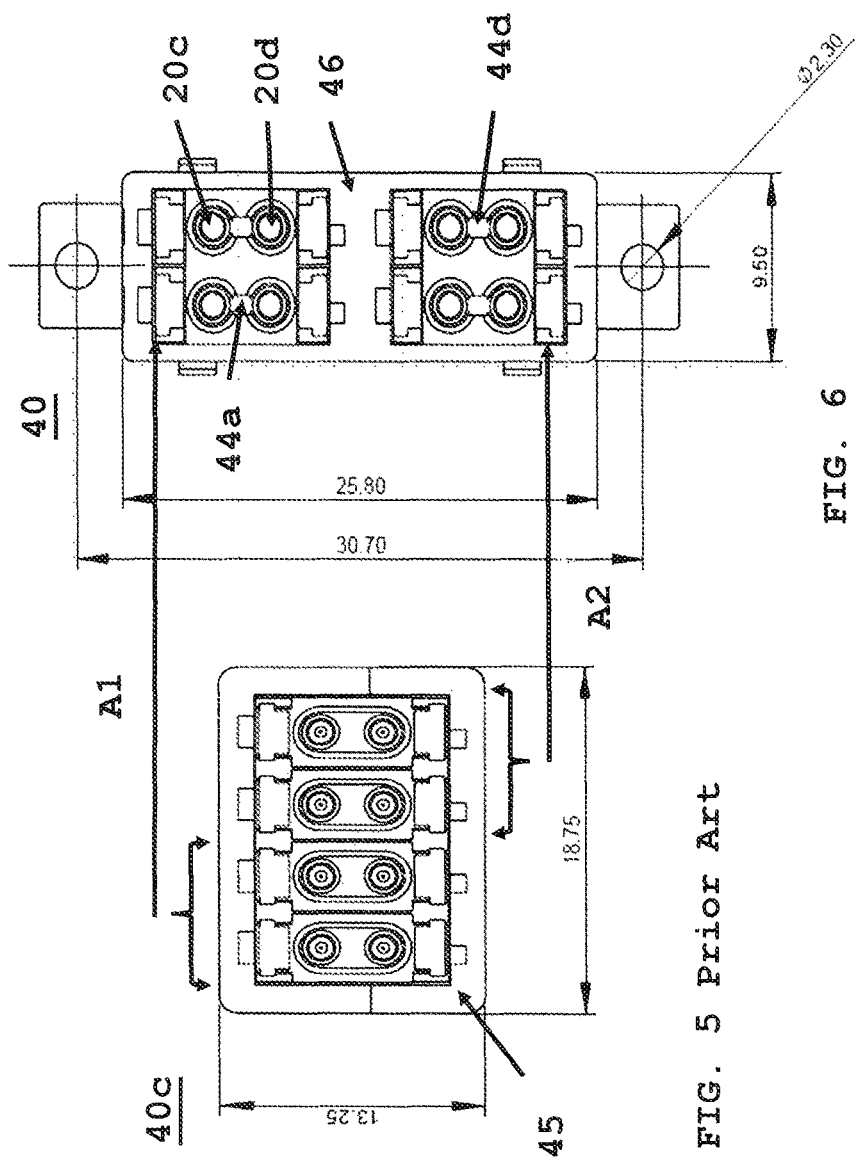
FIG. 5 depicts a prior art quad SFP adapter configured to accept four duplex fiber optic connectors.
FIG. 6 depicts a species of the first embodiment of the present invention configured to accept four duplex fiber optic connectors at a first end of the SC footprint adapter.

As represented in FIG. 2, a quad adapter is formed from a set of vertically stacked SC duplex adapters (40), as described in FIG. 6, and configured to accept a set of duplex fiber optic connectors (12). The first set of duplex fiber optic connectors (12) are accepted in a first port (40d.1). A second set of duplex fiber optic connectors (12) are accepted in a second port (40d.2). At an opposing port (40d.4) from port (40d.1) is a third set of duplex fiber optic connectors (12). The first set of connectors and the third set of fiber optic connectors form an optical signal communication pathway.

Figure 4:
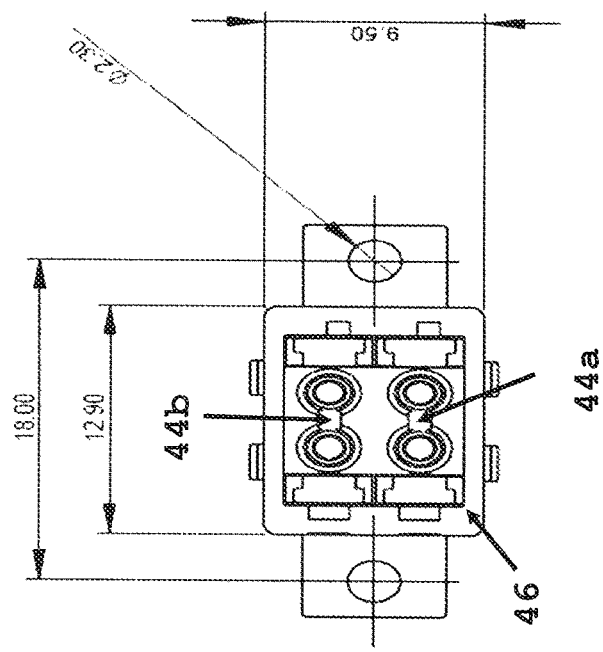
FIG. 4 depicts a first embodiment of the present invention configured to accept a set of duplex fiber optic connectors horizontally at a first end of a SC footprint adapter.
Figure 3:
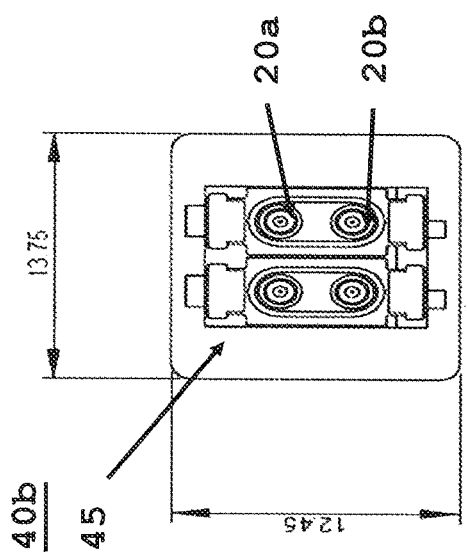
FIG. 3 depicts a prior art duplex SFP adapter configured to accept a set of duplex fiber optic connectors at a first end of the adapter.

FIG. 3 depicts a prior art adapter (40b) having a SFP foot print with outer dimensions of about 13.75 mm wide and 12.45 mm high where the alignment sleeve holder openings (20a, 20b) are vertically opposed. FIG. 4 depicts a first embodiment of the present invention as a SC footprint that is smaller in overall dimensions as opposed to the SFP footprint. As is known in the prior art, a SC footprint adapter is not sized or configured to accept one or more duplex fiber optic connectors (12) or one or more behind-the-wall fiber optic connectors (10). By reducing the overall dimensions, two duplex fiber optic connectors can be secured within an adapter having a SC footprint. To accommodate a decreased outer housing wall thickness (46), a bridge member (44a, 44b) is added between the alignment sleeve holder openings (20a, 20b) configured to accept a ferrule formed as part of ferrule assembly (16a, 16b) of a duplex fiber optic connector, refer to FIG. 12. Reducing the wall thickness (46) (also called reduced dimensional outer housing) allows for a reduction in overall dimensions when the duplex fiber optic connectors are inserted horizontal instead of vertical, as configured in FIG. 3. Converting from a SFP footprint adapter to SC footprint adapter to accept duplex fiber optic connectors reduces dimensional outer housing about 30%.

FIG. 5 is a prior art quad adapter (40c) made up of two SFP footprint duplex adapters with an overall width of about 18.75 mm and a height of about 13.25 mm. The first side of the adapter (40c) is configured to accept four duplex fiber optic connectors (10, 12). FIG. 6 is a species of FIG. 4. In FIG. 6, adapter (40) is configured as a quad adapter with reduced wall thickness (46), and bridge member (44a-44d) between alignment sleeve holder openings (20c, 20d) and likewise bridge member (44d) can be inserted between a set of alignment sleeve holder openings. FIG. 6 is SC quad adapter formed from a SFP footprint adapter by bridge members (44a-44d) and reduced wall thickness (46) and having the duplex fiber optic connectors installed vertical and side-by-side.

Figure 8:
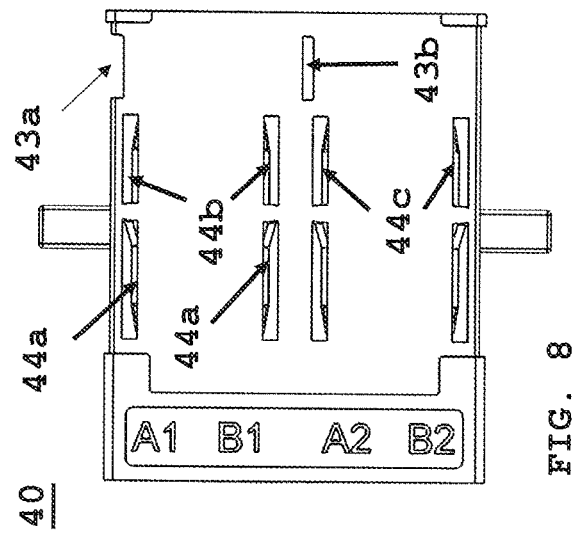
FIG. 8 is a top view of the adapter according to the first embodiment of the present invention configured to accept opposing fiber optic connectors as depicted in FIG. 9.
Figure 7:
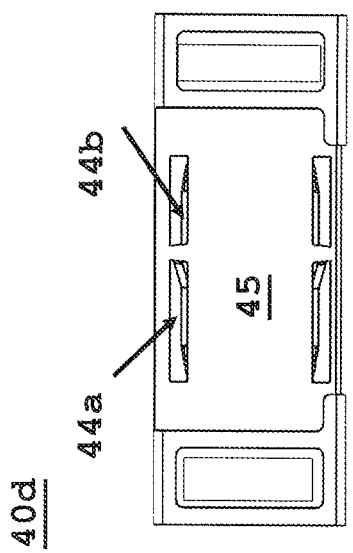
FIG. 7 is a top view of a prior art SFP adapter shown in FIG. 3.
Figure 9:
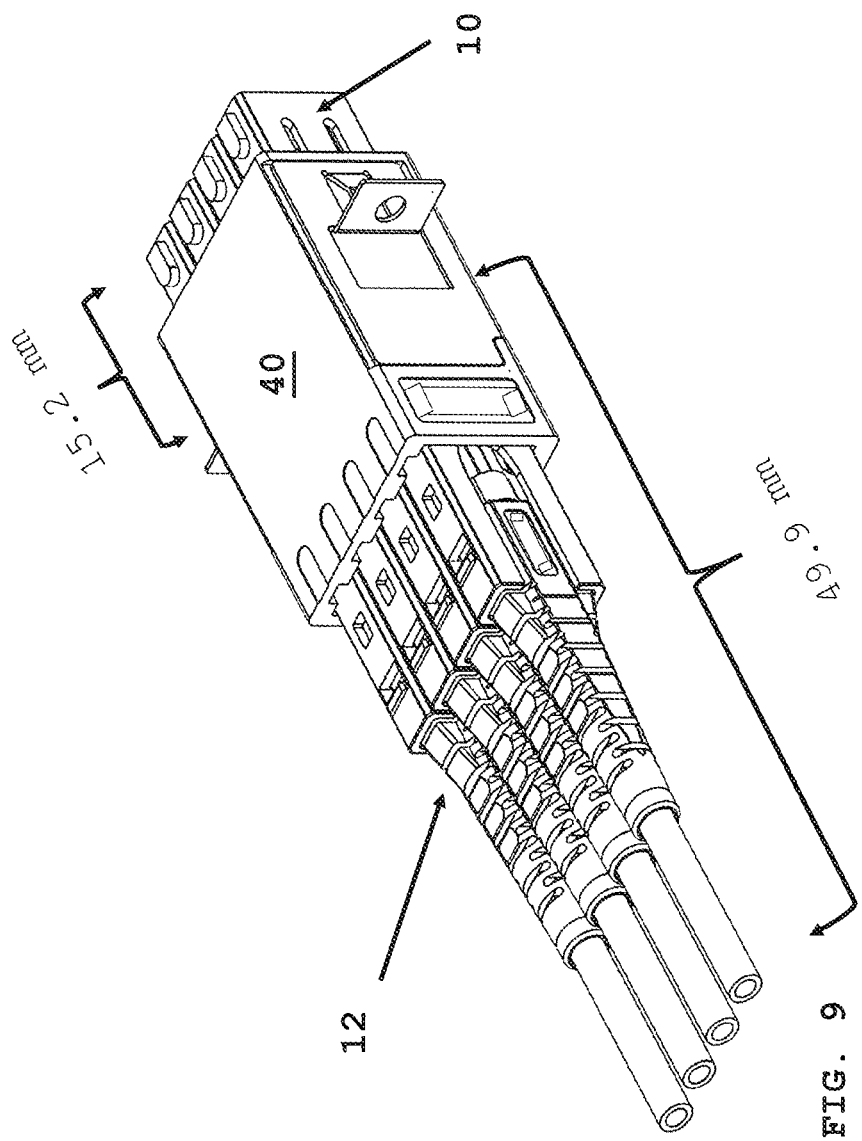
FIG. 9 is a perspective view of the fiber optic adapter according to the first embodiment configured with the duplex fiber optic connector received at the first end of the adapter and the behind-the-wall fiber optic connector received at the second end of the adapter.

FIG. 7 depicts a top view of prior art SFP adapter (40d) configured to accept opposing duplex fiber optic connectors (12) with connector latch hooks (44a, 44b) secured within the adapter housing (45). U.S. Pat. No. 10,281,668B2 discloses adapter (40d) with the latch hooks and duplex fiber optic connector (12). U.S. Pat. No. 10,281,668B2 is fully incorporated by reference and owned by the assignee of the present invention. FIG. 8 depicts a top view of a SC adapter according to the present invention, which is configured as described in FIG. 4 or FIG. 6. The first end of adapter is configured to accept fiber optic connector (12) and secured by latch hooks (44a) in a first port, and an opposing port with latch hook (44b) is configured to accept behind-the-wall connector (10) (refer to FIG. 12) and as shown FIG. 10. Cut-outs (43a, 43b) along with latch hooks (44b, 44c) secure two behind-the-wall connectors (10) side-by-side. FIG. 9 depicts a SC footprint adapter (40) reconfigured according to the first embodiment of the present invention with a plural of duplex fiber optic connectors (12) secured within a plural of ports along the first side of the adapter (40) and an opposing behind-the-wall fiber optic connector (10) within a plural of ports along a second side of the adapter (40). The opposing fiber optic connectors form an optical signal path. The length of the duplex fiber optic connector (12) is about 49.9 mm from the distal end of the boot to the proximal or ferrule tip of connector (12). The length of the behind-the-wall connector (10) is about 15.2 mm. This reduces the overall length of connector-adapter system that deployed opposing connectors (12) from about 100 mm down to about 34.5 mm in overall length, when deploying the behind-the-wall connector opposite the duplex fiber optic connector.

Figure 10:
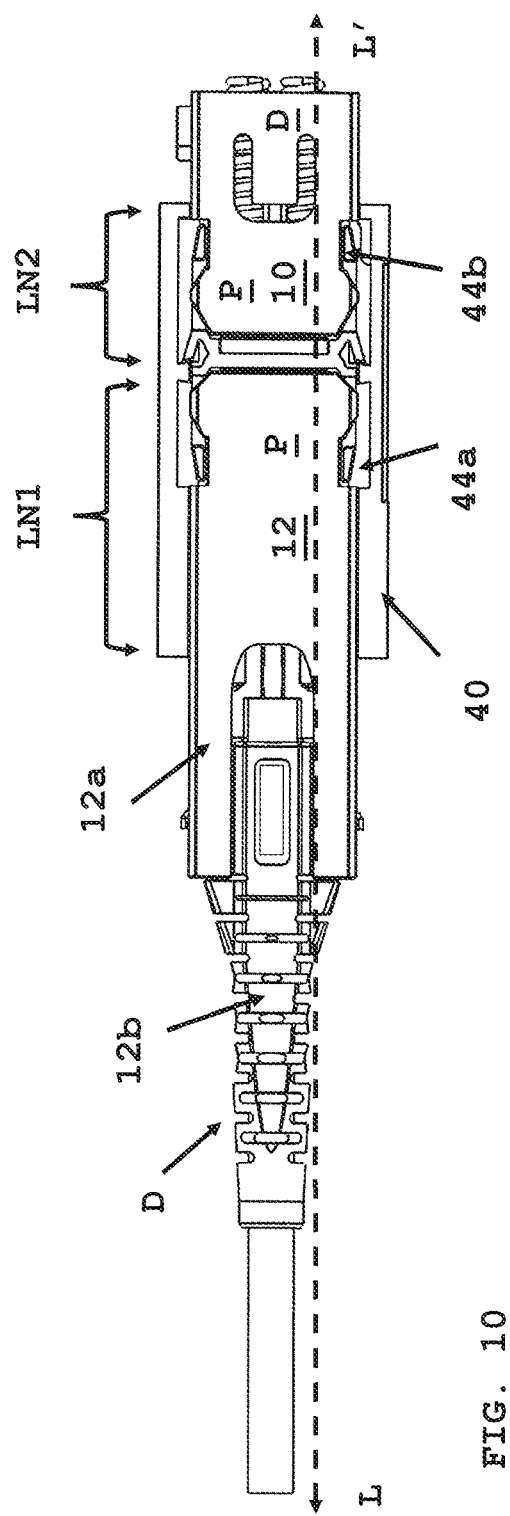
FIG. 10 is a cross-section view of FIG. 9.

FIG. 10 is a cross-section of FIG. 9. FIG. 10 depicts duplex fiber optic connector (12) opposing behind-the-wall fiber optic connector (10) where both fiber optic connectors are secured with their corresponding adapter port by opposing latch hooks (44a, 44b) respectively. The opposing fiber optic connectors form a longitudinal optical pathway (L-L') where an optical signal is delivered by an optical fiber contained within a fiber optic cable at a distal end (D) of the fiber optic connector (12) and transmitted through optical fibers embedded in the ferrules at proximal end (P) of the connector (12). The ferrules in connector (12) oppose the ferrules in connector (10) at proximal end (P) of the connector (10) and proximal end of connector (12). The SC footprint adapter is further reduced in overall dimensions by deploying a behind-the-wall fiber optic connector (10-10d), where the adapter housing at the first end is of length (LN1) and at the second end, the adapter housing is of length (LN2), where LN2 is less than LN1. The overall length of LN1 and LN2 is about 25.7 mm whereas adapter (40a) is about 34.5 mm. The length reduction is about 9.2 mm when deploying the behind-the-wall connector (10-10d) within the ports along one side of adapter (40).

Figure 11:
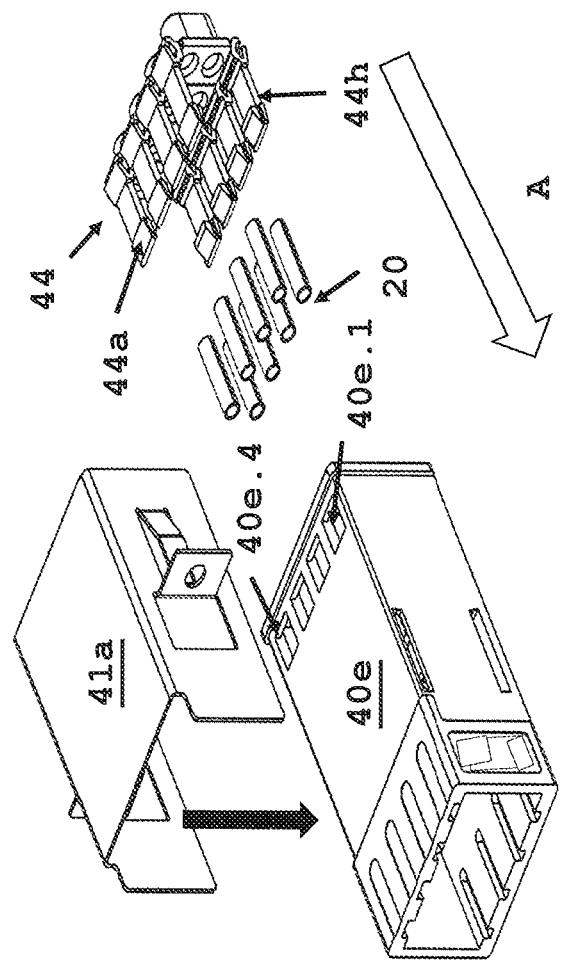
FIG. 11 is a perspective view of a species of the fiber optic adapter of FIG. 11 without the fiber optic connectors secured within the port of the adapter.
Figure 12:
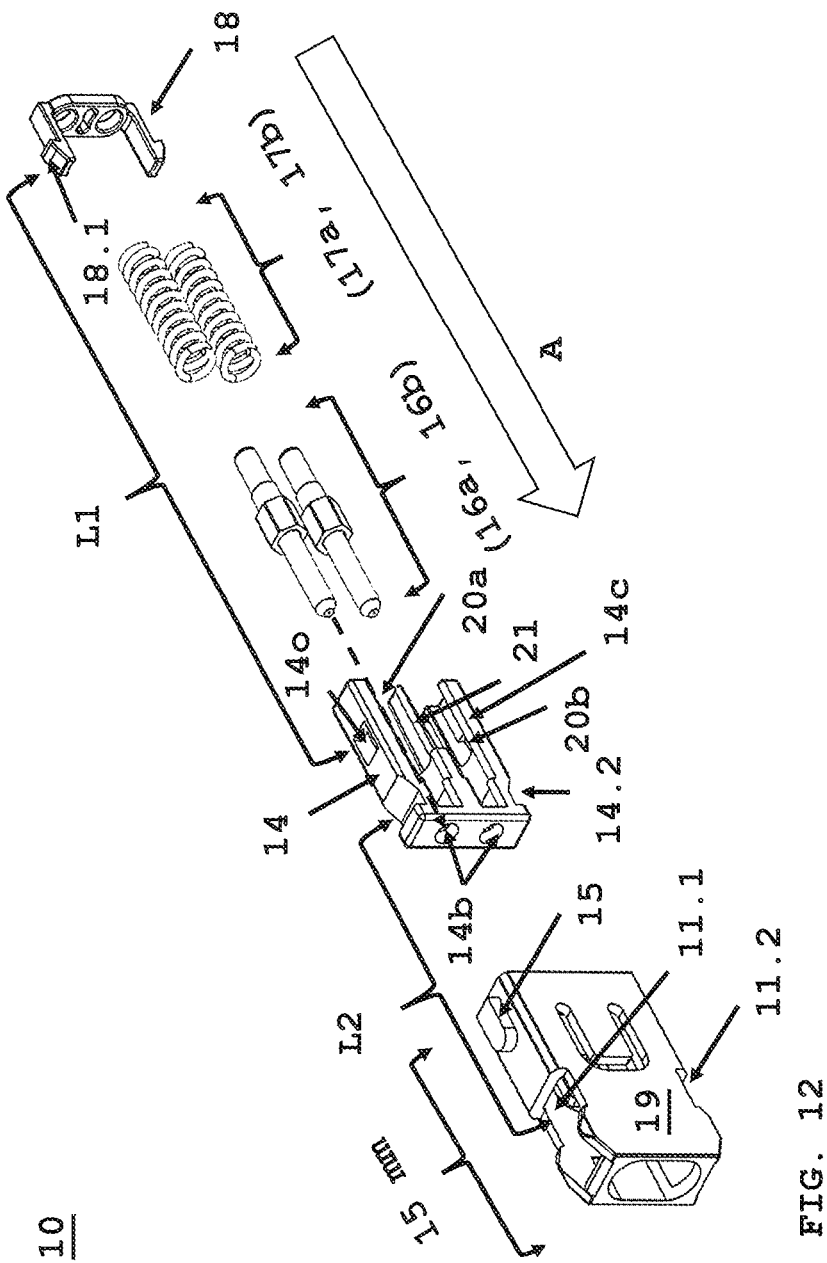
FIG. 12 is an exploded view of a first embodiment of the behind-the-wall fiber optic connector.
Figure 14:
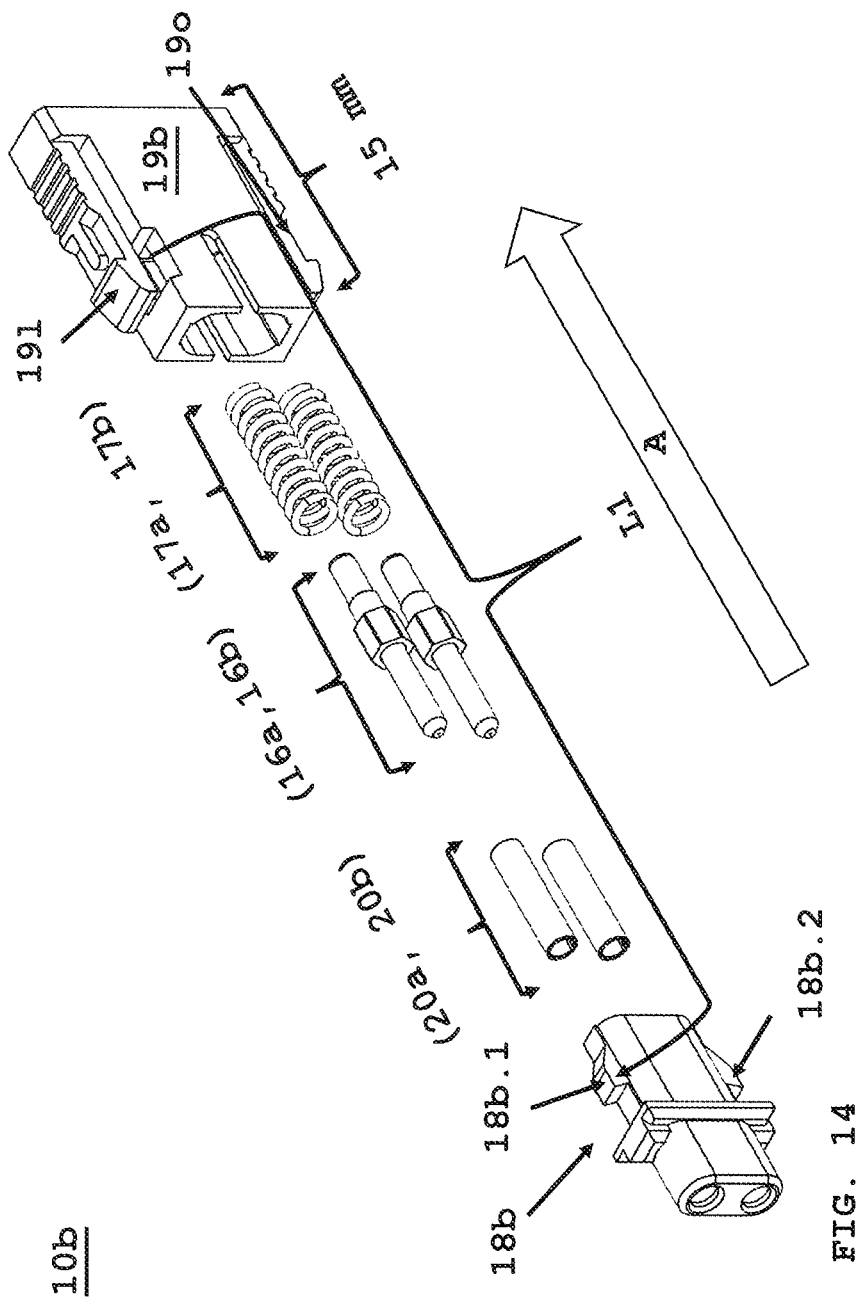
FIG. 14 is an exploded view of a third embodiment of the behind-the-wall fiber optic connector.
Figure 15:
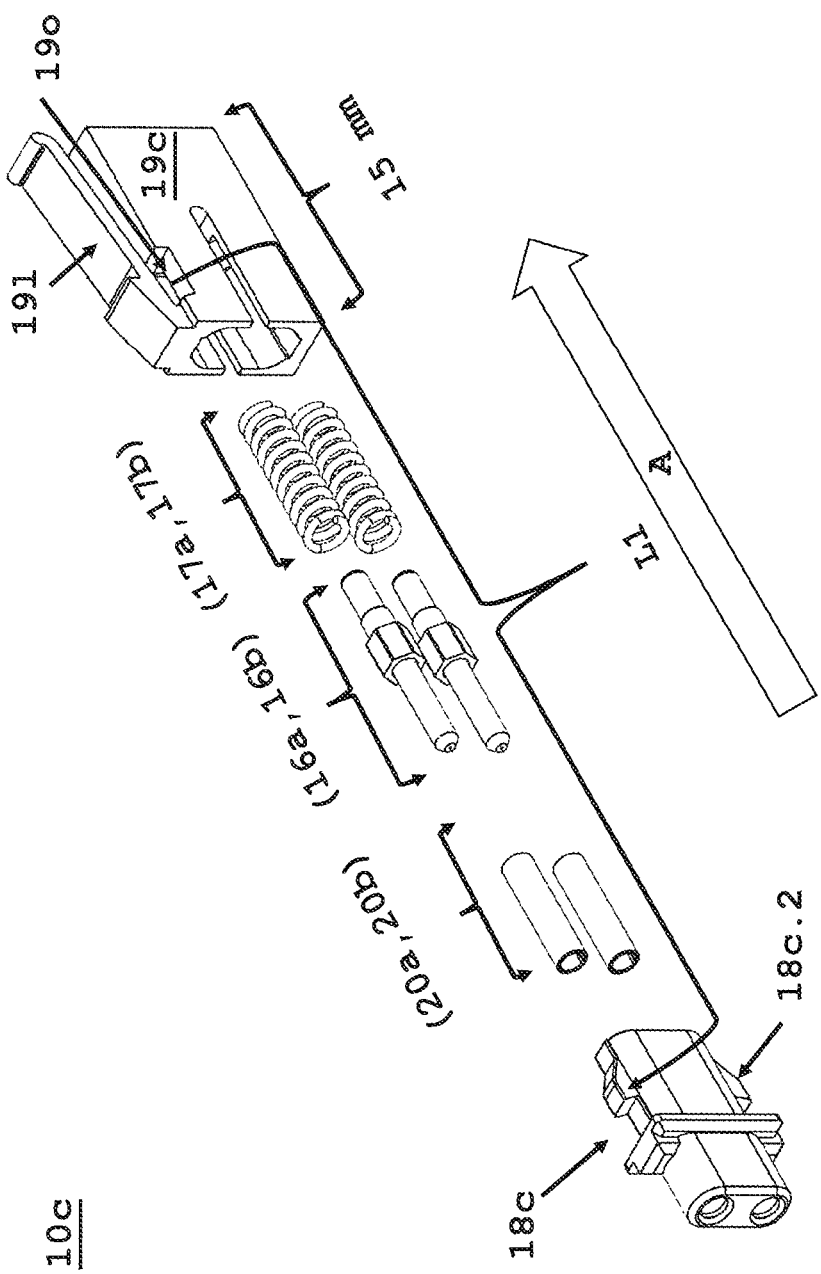
FIG. 15 is an exploded view of a fourth embodiment of the behind-the-wall fiber optic connector.
Figure 16:
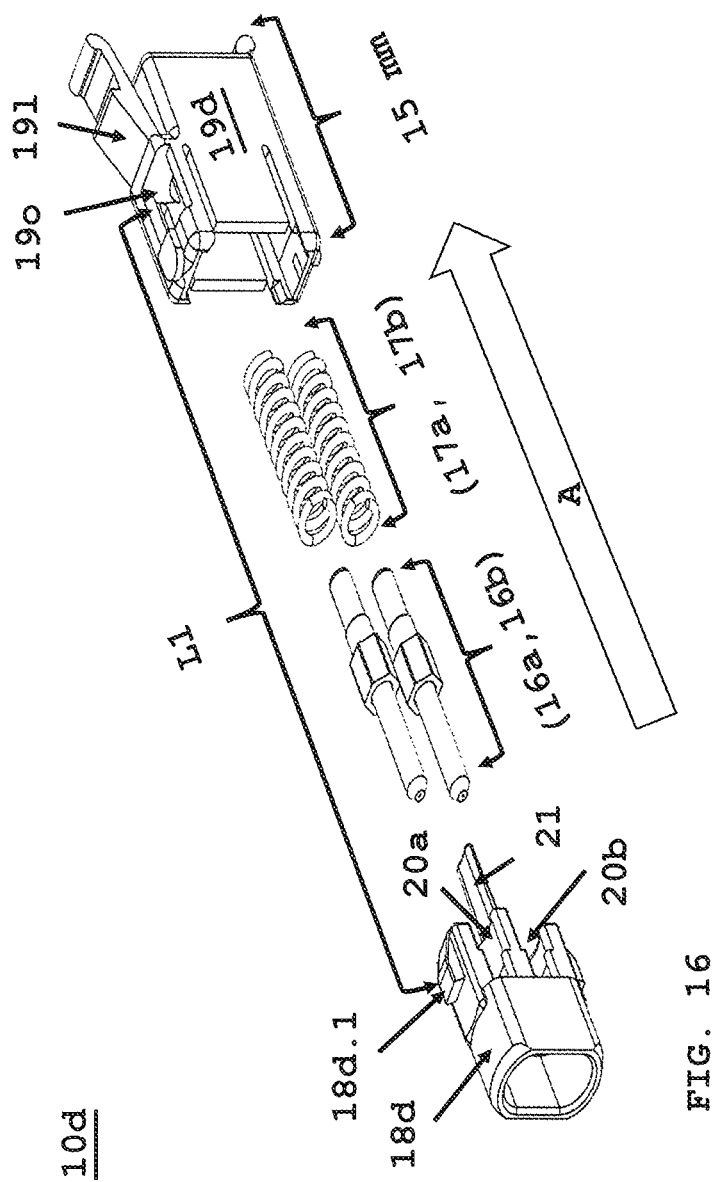
FIG. 16 is an exploded view of a fifth embodiment of the behind-the-wall fiber optic connector, and Corresponding reference numbers indicate corresponding parts throughout the drawings.

FIG. 11 depicts another embodiment of adapter (40). FIG. 11 SC foot print adapter (40e) comprises latch hook assembly (44) with plural of latch hooks (44a-44h) at the proximal end of the assembly (44). The latch hooks are configured to accept a corresponding duplex fiber optic connector (12) between an opposing pair of latch hook. The latch hook assembly (44) is inserted into and secured within a second side of the adapter (40) in the direction of the arrow (A). An adapter latch recess (40e.1-40e.4) is configured to accept and to secure a behind-the-wall fiber optic connector (10b, 10c, 10d) as depicted in FIGS. 14-16. Latch (191) formed as part of the outer housing of the behind-the-wall connector is accepted in the latch recess.

FIGS. 12-16 depict embodiments of the behind-the-wall connector that when deployed with the SFP adapter or SC adapter can reduce the overall length of the connector—adapter assembly by about 9.2 mm. The length reduction is accomplished by removing connector outer housing (12a) and cable boot (12b), and replacing with an inner body, the inner body is formed as an integrated inner body or a two-piece inner body. The behind-the-wall connector is assembled with a set of ferrule assembly (16a, 16b), bias springs (17a, 17b) and a pair of alignment sleeve holder openings (20a, 20b) that accept a proximal end of the ferrule. The alignment sleeve holder openings receive the ferrule protruding from the proximal end of the ferrule assembly. In some embodiments, the outer housing has an external latch that cooperates with an adapter latch recess, depicted in FIG. 11.

FIG. 12 depicts an exploded view of behind-the-wall fiber optic connector (10). Connector (10) comprises an outer housing (19) with opposing cut-outs (11.1, 11.2) at the proximal end of the housing (19). Outer housing (19) is about 15 mm. The outer housing further comprises an alignment key (15) that orients connector (10) within a port of adapter (40). Inner body (14) accepts external hook body (18) along latch line (L1) when hook (18.1) is secured within opening (14o) formed within each outer wall (14c). Inner body (12) is secured within outer housing (19) when recess cut-outs (14.1, 14.2) are received in opposing body cut-outs (11.1. 11.2) along latch line (L2). When assembled in direction of arrow (A), behind-the-wall connector (10) is assembled. In this embodiment, the alignment sleeve holder openings (20a, 20b) have no sidewalls. Shelf (21) extends from a proximal end of the inner body and accepts the ferrule assembly up to proximal end of the ferrule flange. When the ferrule assembly (16a, 16b) is fully inserted with inner body (14), the ferrule protrudes through an opening (14b) (as shown by the dashed arrow), which is the alignment sleeve holder opening. In the configuration, the inner front body having open sidewalls with a shelf (21) allows for the removal of the alignment sleeves, as depicted in FIG. 12.

Figure 13:
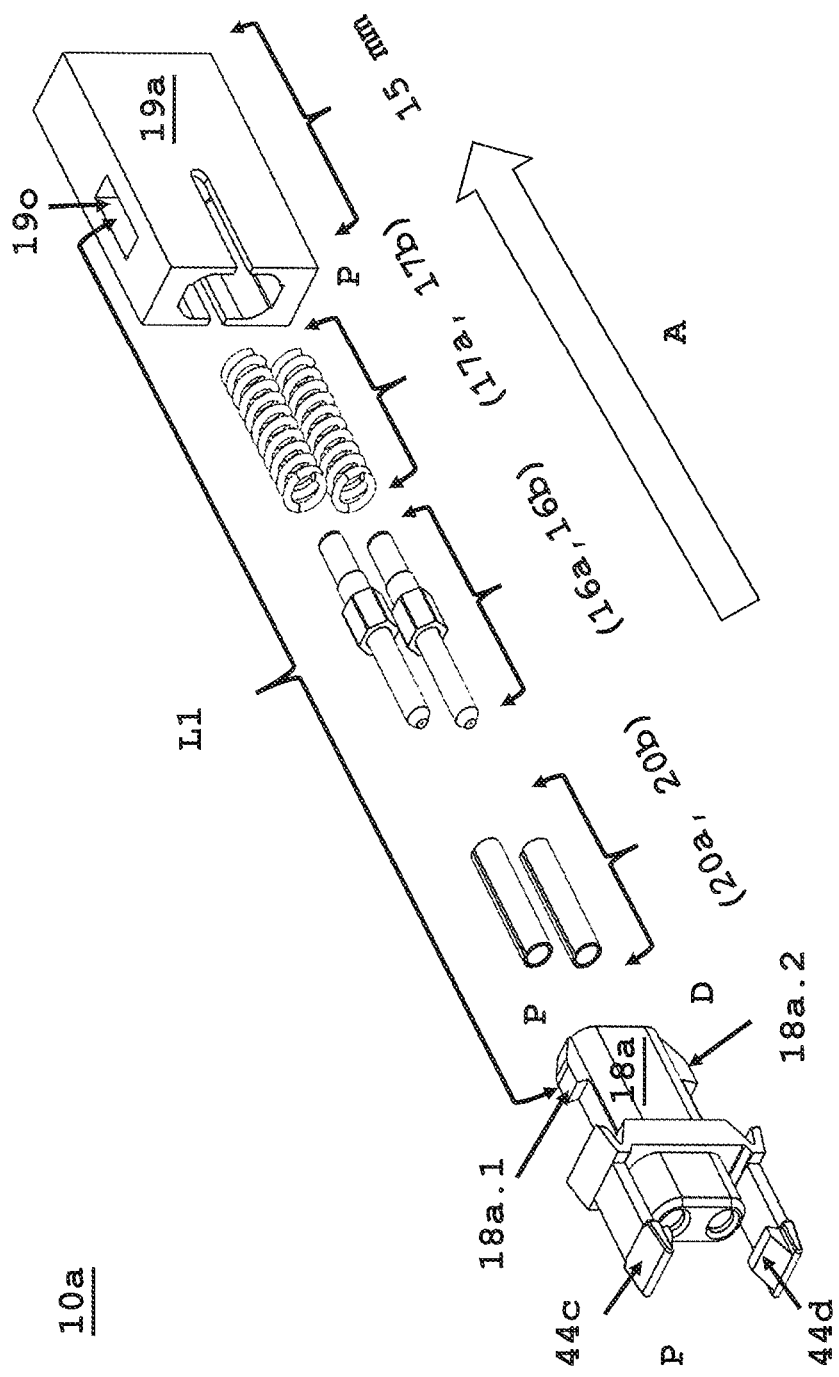
FIG. 13 is an exploded view of a second embodiment of the behind-the-wall fiber optic connector.

FIG. 13 depicts a second embodiment of behind-the-wall connector (10a). Connector (10a) deploys an integrated inner body (18a). Inner body (18a) comprises a pair of opposing latch hooks (44c, 44d) at a proximal end (P) of the assembled connector (10a). The latch hook assembly (44). The distal end (D) has opposing protrusions (18a.1, 18a.2), received in opening (19o) formed on opposing sides of outer housing (19a). Outer housing (19a) is about 15 mm in length. When assembled in direction of arrow (A), integrated inner body (18a) accepts alignment sleeves (20a, 20b) at the distal end of the inner body (18a). The alignment sleeves (20a, 20b) accept a corresponding ferrule at a proximal end (P) of each ferrule assembly (16a, 16b), and a pair of bias springs (17a, 17b) are received at a distal end (D) of the ferrule assembly (16a, 16b) and bias each ferrule assembly forward. The adapter hook (18a.1, 18a.2) is integrated or formed as part of the inner body (18a). In this embodiment, alignment sleeves (20a, 20b) are inserted into openings at a distal end of inner body (18a), which acts as an alignment sleeve holder. The alignment sleeve holder openings are at the proximal end (P) of the alignment sleeves.

FIGS. 14-16 are exploded views that depict an outer housing (19b-19d) with an external reverse release latch (191) that is received within a latch recess (40e.1-40e.4) formed at one end of an adapter. The external latch allows a user to depress the latch and remove the behind-the-wall connector (10b-10d) from its corresponding adapter latch recess (40e.1-40e.4). For connector (10b), protrusion (18b.1, 18b.2) formed as part of inner body (18b) are received in opening (19o) formed on one-side of outer housing (19b), which is about 15 mm in length, along latch line (L1) to assemble connector (10b) along arrow (A). FIG. 14 alignment sleeve holder openings are similarly configured as described in FIG. 13.

FIG. 15 depicts a third embodiment of the behind-the-wall connector (10c). Inner body (18c) has opposing protrusions (18c.1, 18c.2) form connector (10c), when the protrusions are received with openings (190) formed as part of connector outer housing (19c). Outer housing (19c) is about 15 mm in length. Release latch (191) allows a user to remove assembled connector (10c) from its adapter port recess (40e.1-40e.4). FIG. 15 alignment sleeve holder openings are similarly configured as described in FIG. 13.

FIG. 16 depicts an exploded view of behind-the-wall connector (10d) with an external latch (191) positioned at the most distal end (D) of connector housing (19d). Unlike release latch (191) of FIG. 15, which is disposed at the most proximal end (P) of the outer housing (19d). Outer housing (19d) length is about 15 mm. Connector (10d) is formed when protrusions (18d.1, 18d.2) are received in opening (190) on opposing sides of connector outer housing (19d) along latch line (L1), to form the connector (10d) when assembled in direction of arrow (A). Unlike FIG. 15 alignment sleeves (20a, 20b), the alignment sleeves of connector (10d) are formed as part of inner body (18d), and like FIG. 12, the open alignment sleeve allows from more clearance when assembling the connector. Alignment sleeve holder openings in FIG. 16 are similar configured as described in FIG. 12. FIG. 16 inner body (18d) is similar constructed as FIG. 12 inner body (18a), with open sidewalls and an inner shelf (21).

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g.,"a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic port device, the fiber optic port device comprising:
   a housing comprising:
      a first side wall, a second side wall, and a width extending from the first side wall to the second side wall,
      a first end wall, a second end wall, and a height extending from the first end wall to the second end wall,
      a middle wall extending from the first end wall to the second end wall, the middle wall being spaced apart between the first side wall and the second side wall of the outer housing,
      wherein the first side wall, the middle wall, the first end wall, and the second end wall define a first generally rectangular receptacle having first and second duplex connector ports spaced apart along the height,
      wherein the middle wall, the second wall, the first end wall, and the second end wall define a second generally rectangular receptacle having third and fourth duplex connector ports spaced apart along the height;
   a first pair of ferrule alignment sleeves received in the first duplex connector port;
   a second pair of ferrule alignment sleeves received in the second duplex connector port;
   a third pair of ferrule alignment sleeves received in the third duplex connector port; and
   a fourth pair of ferrule alignment sleeves received in the fourth duplex connector port,
   wherein each pair of ferrule alignment sleeves comprises first and second ferrule alignment sleeves spaced apart along the width of the housing.

2. The fiber optic port device of claim 1, wherein each of the first and second generally rectangular receptacles is non-partitioned such that each of the first and second generally rectangular receptacles is free of internal widthwise walls separating the duplex connector ports.

3. The fiber optic port device of claim 2, wherein the middle wall has a second side facing the second generally rectangular receptacle, the second side shaped with first features for aligning a first plurality of duplex connectors with the first plurality of duplex connector ports.

4. The fiber optic port device of claim 1, wherein the middle wall has a first side facing the first generally rectangular receptacle, the first side shaped with first features for aligning a first plurality of duplex connectors with the first plurality of duplex connector ports.

5. The fiber port device as set forth in claim 4, wherein the first features define a first plurality of alignment channels spaced apart along the connector height and wherein second features define a second plurality of alignment channels spaced apart along the connector height,
   wherein the first plurality of alignment channels is configured to slidably receive correspondingly sized and shaped portions of the first plurality of duplex connectors to align the first plurality of duplex connectors with the first plurality of duplex connector ports; and
   wherein the second plurality of alignment channels is configured to slidably receive correspondingly sized and shaped portions of the second plurality of duplex connectors to align the second plurality of duplex connectors with the second plurality of duplex connector ports.

6. The fiber optic port device as set forth in claim 1, wherein the height is 9.5 mm.

7. The fiber optic port device as set forth in claim 6, wherein the width is 25.8 mm.

8. The fiber optic port device as set forth in claim 1, wherein the width is 25.8 mm.

9. The fiber optic port device as set forth in claim 1, wherein the housing is configured to fit four duplex connectors in a duplex-SC adapter footprint.

10. The fiber optic port device as set forth in claim 1, further comprising a pair of opposing adapter latch hooks in each of the first, second, third, and fourth duplex connector ports.

11. The fiber optic port device as set forth in claim 10, wherein each pair of opposing adapter latch hooks comprises a first adapter latch hook and a second adapter latch hook on opposite sides of the respective one of the first, second, third, and fourth duplex connector ports, and wherein each first adapter latch hook is configured to latch with a first side of a duplex connector port mated in the respective one of the first, second, third, and fourth duplex connector port and each second adapter latch hook is configured to latch with is configured to latch with a second side of the duplex connector port mated in the respective one of the first, second, third, and fourth duplex connector port.

12. A fiber optic port device, the fiber optic port device comprising:
   a housing comprising:
      a first side wall, a second side wall, and a width extending from the first side wall to the second side wall,
      a first end wall, a second end wall, and a height extending from the first end wall to the second end wall, and
      a middle wall extending from the first end wall to the second end wall, the middle wall being spaced apart between the first side wall and the second side wall of the outer housing,
      the housing defining first and second duplex connector ports between the first end wall and the middle wall and second and third duplex connector ports between the second end wall and the middle wall;

the middle wall having a first side facing the first and second duplex connector ports and a second side facing the third and fourth duplex connector ports;

wherein the first end wall defines a first groove aligned with the first duplex connector port and a second groove aligned with the second duplex connector port, the first groove and the second groove each having a first heightwise dimension;

wherein the first side of the middle wall defines a third groove aligned with the first duplex connector port and a fourth groove aligned with the third duplex connector port, the third groove and the fourth groove having a second heightwise;

wherein the second end wall defines a fifth groove aligned with the third duplex connector port and a sixth groove aligned with the fourth duplex connector port, the fifth groove and the sixth groove each having the second heightwise dimension;

wherein the second side of the middle wall defines a seventh groove aligned with the third duplex connector port and an eighth groove aligned with the fourth duplex connector port, the seventh groove and the eighth groove having the first heightwise dimension less than the first heightwise dimension;

wherein the second heightwise dimension is less than the first heightwise dimension.

13. The fiber optic port device as set forth in claim 12, wherein the height is 9.5 mm.

14. The fiber optic port device as set forth in claim 13, wherein the width is 25.8 mm.

15. The fiber optic port device as set forth in claim 12, wherein the width is 25.8 mm.

16. The fiber optic port device as set forth in claim 12, wherein the housing is configured to fit four duplex connectors in a duplex-SC adapter footprint.

17. The fiber optic port device as set forth in claim 12, further comprising a pair of opposing adapter latch hooks in each of the first, second, third, and fourth duplex connector ports.

18. The fiber optic port device as set forth in claim 17, wherein each pair of opposing adapter latch hooks comprises a first adapter latch hook and a second adapter latch hook on opposite sides of the respective one of the first, second, third, and fourth duplex connector ports, and wherein each first adapter latch hook is configured to latch with a first side of a duplex connector port mated in the respective one of the first, second, third, and fourth duplex connector port and each second adapter latch hook is configured to latch with is configured to latch with a second side of the duplex connector port mated in the respective one of the first, second, third, and fourth duplex connector port.

19. The fiber optic port device as set forth in claim 12, further comprising:
 a first pair of ferrule alignment sleeves received in the first duplex connector port;
 a second pair of ferrule alignment sleeves received in the second duplex connector port;
 a third pair of ferrule alignment sleeves received in the third duplex connector port; and
 a fourth pair of ferrule alignment sleeves received in the fourth duplex connector port,
 wherein each pair of ferrule alignment sleeves comprises first and second ferrule alignment sleeves spaced apart along the width of the housing such that the fiber optic port device has a total of four ferrule alignment sleeves in the first generally rectangular receptacle and a total of four ferrule alignment sleeves in the second generally rectangular receptacle.

* * * * *